US006226984B1

(12) United States Patent
Ford

(10) Patent No.: US 6,226,984 B1
(45) Date of Patent: May 8, 2001

(54) MARINE WET EXHAUST SYSTEM

(75) Inventor: John R. Ford, Xenia, OH (US)

(73) Assignee: Centek Industries, Inc., Thomasville, GA (US)

( * ) Notice: Subject to any disclaimer, the term of this patent is extended or adjusted under 35 U.S.C. 154(b) by 0 days.

(21) Appl. No.: 09/120,658

(22) Filed: Jul. 22, 1998

Related U.S. Application Data

(60) Provisional application No. 60/055,115, filed on Aug. 8, 1997.

(51) Int. Cl.[7] ................. F01N 7/10; F01N 3/08
(52) U.S. Cl. ............................ 60/310; 60/311
(58) Field of Search ............... 60/297, 310, 292, 60/274, 311, 278, 285, 286; 55/337, DIG. 30, 446; 181/256, 210, 228, 215, 272, 260, 238; 96/386

(56) References Cited

U.S. PATENT DOCUMENTS

| | | |
|---|---|---|
| 714,080 | 11/1902 | Whitson . |
| 2,142,268 | 1/1939 | Gibbs, Jr. . |
| 2,487,176 | 11/1949 | Pitt et al. . |
| 2,721,619 | 10/1955 | Cheairs . |
| 2,763,982 | 9/1956 | Dega . |
| 3,296,997 | 1/1967 | Hoiby et al. . |
| 3,495,385 | 2/1970 | Glass . |
| 3,630,030 | 12/1971 | Wagner . |
| 3,759,041 | 9/1973 | North et al. . |
| 3,815,337 * | 6/1974 | Lenane .................. 55/276 |
| 3,831,377 * | 8/1974 | Morin .................. 60/274 |
| 4,019,456 | 4/1977 | Harbert . |
| 4,503,680 | 3/1985 | Wood . |
| 4,713,029 | 12/1987 | Ford . |
| 4,781,021 | 11/1988 | Winberg . |
| 4,831,822 * | 5/1989 | Yoshimura ............ 60/310 |
| 5,022,877 | 6/1991 | Harbert . |
| 5,046,977 | 9/1991 | Rodskier . |
| 5,078,631 * | 1/1992 | Harbert .................. 440/89 |
| 5,096,446 | 3/1992 | Tazaki et al. . |
| 5,248,859 | 9/1993 | Borla . |
| 5,284,451 | 2/1994 | Chiu . |
| 5,588,888 | 12/1996 | Magharious . |
| 5,746,630 | 5/1998 | Ford et al. . |

\* cited by examiner

Primary Examiner—Jeanette Chapman
Assistant Examiner—Sneh Varma
(74) Attorney, Agent, or Firm—Biebel & French

(57) ABSTRACT

The invention relates to a marine wet exhaust system and a method for treating the exhaust from a marine engine. The system comprises a first conduit for receiving an exhaust flow including gaseous, liquid and particulate solid components, a separator for separating the liquid and particulate components from gaseous component, and a second conduit for expelling the gaseous component. A third conduit is provided for receiving from the separator the liquid and particulate solid components, which then pass to a filter for separating the particulate solid component from the liquid component, and the liquid component is discharged via a fourth conduit.

16 Claims, 4 Drawing Sheets

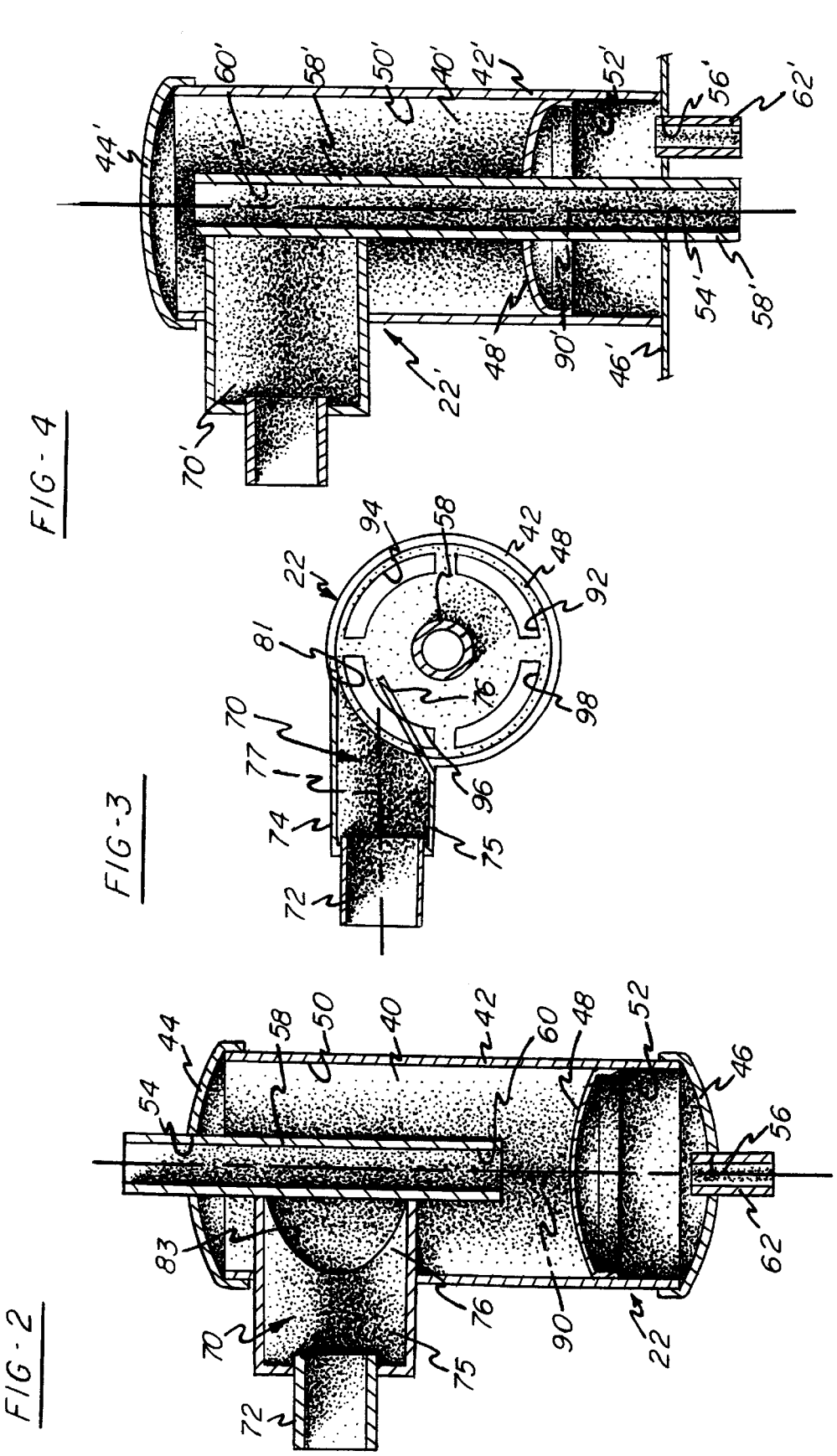

MARINE WET EXHAUST SYSTEM

PRIOR PROVISIONAL APPLICATION

Applicant claims the benefit of the filing date of Provisional Application Ser. No. 60/055,115, filed Aug. 8, 1997.

BACKGROUND OF THE INVENTION

1. Field of the Invention

The present invention pertains to exhaust systems for water craft, and more particularly to improved marine wet exhaust systems for reducing the emission of particulate materials in the exhaust flows of marine engines.

2. Description of the Related Art

The internal combustion engines commonly used to power watercraft generate power through the rapid combustion of organic fuels and the expansion of the combustion products against pistons coupled to a drive shaft. The combustion products typically include particulate materials capable of polluting the surrounding air or water when released. The periodic combustion, expansion and discharge of the combustion products also produces undesirable heat and noise in the exhaust flow from the engine.

Internal combustion engines utilized in watercraft typically use the water supporting the craft for cooling purposes. The water is drawn into the craft and circulated through an engine cooling jacket or engine coolant heat exchanger. The water is then commonly injected into the exhaust system to cool the combustion products so that they might be safely discharged through the hull of the craft without presenting a fire hazard. Accordingly, a marine wet exhaust system must handle not only exhaust gases, but also the waste cooling fluid or water which is injected into the exhaust system.

In addition to safely handling exhaust gases and waste cooling water, a marine wet exhaust system should muffle or attenuate the exhaust noise generated by operation of the marine engine. Muffling of exhaust noise from marine engines has been handled in a number of ways. For example, the exhaust may be discharged below the water level. In outboard engines and in inboard/outdrive installations the exhaust is sometimes routed through the drive unit so that the exhaust gas and waste cooling water are discharged through or adjacent the propeller driving the craft. An exhaust system including a water separator for use in outboard drive units with exhaust routed through the propeller under the water line is disclosed in North et al., U.S. Pat. No. 3,759,041.

Mufflers are often placed along the exhaust conduit running between the engine and the exhaust discharge to attenuate the exhaust noise. One such example is shown in Harbert, U.S. Pat. No. 5,022,877.

Often, marine muffler designs are closely akin to the mufflers used on automobiles, but are constructed of materials such as fiberglass which can better tolerate the marine environment. While such mufflers are popular in the boating industry, many do not provide good attenuation of the noise generated by marine engines.

Furthermore, such mufflers often do not adequately separate water from the exhaust gas, even if they are designed to perform any water separation at all. The engine and muffler are often mounted amidship and located as far as 30 ft. to 40 ft. from the discharge. At these lengths it is difficult to maintain an overall downward grade necessary to drain the waste coolant water separated from the exhaust flow. In practice, the exhaust conduit leading from the muffler to the discharge may curl up-and-down as it crosses various sections of the boat, creating traps where water may accumulate and constrict the exhaust flow.

Even among those devices which do separate cooling water from the exhaust flow, it does not appear that any provision has been made to separate particulate materials from either the cooling water or the exhaust flow before the cooling water and exhaust are discharged into the surrounding water and the atmosphere.

Catalytic converters have been used in land vehicles to adsorb or otherwise remove pollutants from automotive exhaust flows. Such devices are less practical in marine craft, however, inasmuch as the very high temperatures necessary to the reduction processes in the converters cannot be tolerated in the less efficiently ventilated engine spaces in water craft.

Consequently, there remains a need for a marine wet exhaust system capable of both attenuating exhaust noise and separating particulate material before the cooling water and the exhaust are discharged.

SUMMARY OF THE INVENTION

This need is addressed by means of the marine wet exhaust system of the present invention. The marine wet exhaust system of the present invention includes a centrifugal water separator having a cooling water outlet in series with a filter for removing particulate materials.

The structure of the centrifugal separator is not critical to the present invention. Nonetheless, a preferred centrifugal water separator is a combined muffler/water separator of the type described in U.S. Provisional Application No. 60/003,073, filed Aug. 31, 1995, and U.S. patent application Ser. No. 08/703,346, filed Aug. 26, 1996, the disclosures of which are incorporated by reference. The preferred combined muffler/water separator comprises a generally cylindrical housing having an inlet structure for inducing the exhaust flow to rotate about a longitudinal axis of an interior of the housing. A first outlet positioned along the axis conducts dried exhaust gas from the housing while a second outlet spaced from the first outlet drains water (and the entrained particulate materials) from the housing. Preferred inlet structures include tangential inlets and inlets near which baffle or vane structures are mounted for deflecting the exhaust flow along an inner wall of the housing.

The structure of the filter is not critical to the present invention. Nonetheless, the preferred filter is a conventional fibrous-type filter for separating and retaining particulate materials larger than a pre-selected mesh size. The preferred filter includes a removable filter cartridge and a holding tank for retaining the particulate materials. The preferred holding tank includes means such as an opening for access to the removable filter and to the stored particulate materials.

The marine wet exhaust system is designed so as to separate the particulate materials from the exhaust flow with the waste cooling water and then filter the particulate materials out of the cooling water as the cooling water flows toward a water drain below the water line. The preferred muffler/water separator is designed such that cooling water and particulate materials are removed near the inner wall of the separator housing. The particulate materials entrained in the separated cooling water flow downwardly into the filter, in which the particulates larger than the pre-selected mesh size are separated and retained for later disposal. Ideally, no significant quantity of particulate materials larger than the pre-selected mesh size will be released into the environment with the exhaust gas or cooling water.

In an especially preferred form, the marine wet exhaust system of the present invention also comprises a first exhaust conduit for conducting exhaust gas from the marine engine to the muffler/water separator; a water injector for injecting droplets of water into the first exhaust conduit; a second exhaust conduit for receiving dried exhaust gas from the muffler/water separator and expelling the exhaust gas to the environment; a cooling water conduit for conducting the separated cooling water and the entrained particulate materials to the filter; and a water drain for discharging the filtered cooling water, preferably below the water line.

Therefore, it is one object of the present invention to provide a marine wet exhaust system capable of separating particulate materials from the exhaust flow. The invention will be further described in conjunction with the appended drawings and following detailed description.

BRIEF DESCRIPTION OF THE DRAWINGS

FIG. 2 is a side sectional view of a first embodiment of a preferred combined marine wet muffler and water separator for the marine wet exhaust system;

FIG. 3 is a top sectional view of the preferred combined marine wet muffler and water separator of FIG. 2;

FIG. 4 is a side sectional view of a second embodiment of a preferred combined marine wet muffler and water separator for the marine wet exhaust system of FIG. 1;

DETAILED DESCRIPTION OF THE PREFERRED EMBODIMENT

Figure 1:
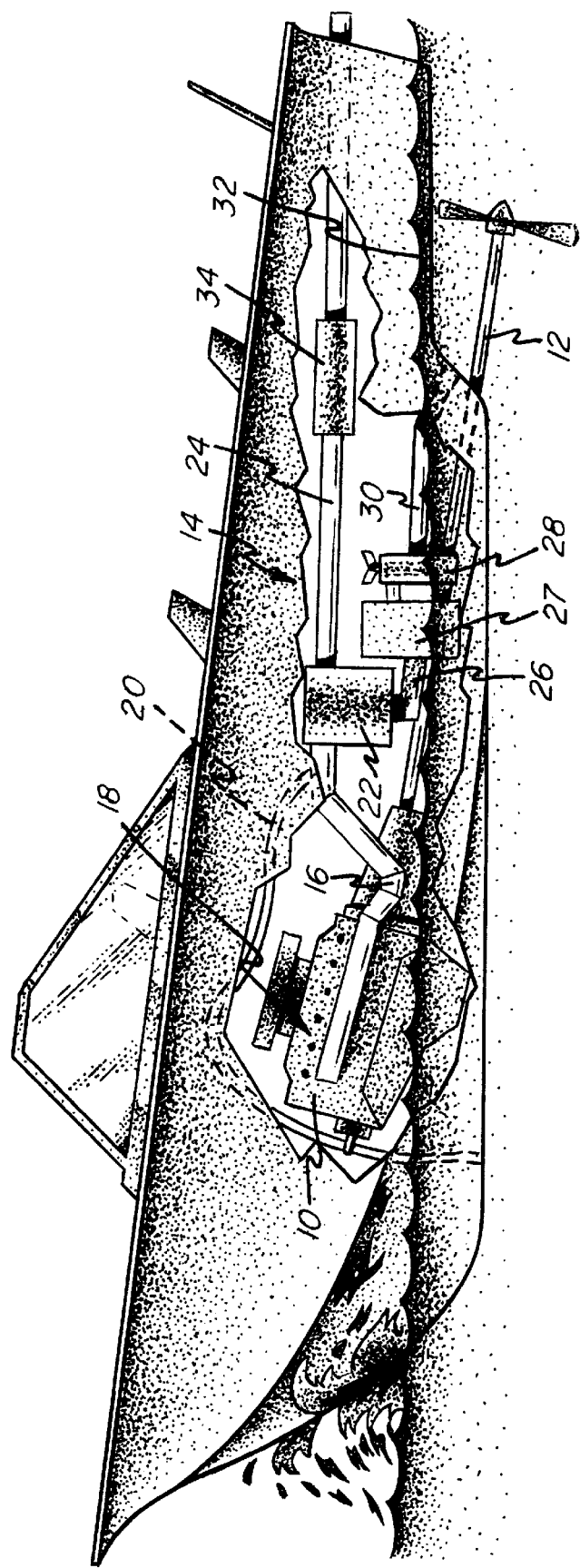
FIG. 1 is a schematic view of the marine wet exhaust system of the invention.

Referring initially to FIG. 1 of the drawings, an engine 10 for rotating a drive shaft 12 (shown partially in phantom) is provided with a marine wet exhaust system 14 for treating and expelling exhaust gas generated by the engine 10. The marine wet exhaust system 14 includes a first exhaust conduit or first conduit 16 for receiving exhaust gas from an engine exhaust manifold 18; a water injection tube 20 (shown partially in phantom) for injecting waste coolant water from the engine 10 into the first exhaust conduit 16 to cool the exhaust gas; a combined marine wet muffler and water separator (also referred to as a "muffler/water separator") 22 for attenuating exhaust noise and separating the waste coolant water from the exhaust flow; a second exhaust conduit or second conduit 24 (shown partially in phantom) for expelling the exhaust gas; a coolant water conduit or third conduit 26 for conducting waste cooling water (and entrained particulate materials) away from the muffler/water separator 22; a filter 28 for removing particulate materials from the cooling water received from the coolant water conduit 26; and a water drain or fourth conduit 30 for expelling filtered waste coolant water.

Since the preferred muffler/water separator 22 efficiently separates the waste coolant water from the exhaust gas, the path and grade of the second exhaust conduit 24 are not critical and the second exhaust conduit 24 may discharge the exhaust either above the water line 32 (as shown in FIG. 1) or below. The efficiency of the preferred muffler/water separator 22 reduces the likelihood that water will collect at bends in the second exhaust conduit 24, thereby blocking or partially blocking the exhaust flow through the conduit 24.

Preferably, the water drain 26 discharges the waste cooling water below the water line 32. In an especially preferred embodiment, the cooling water conduit 26, the filter 28 and the water drain 30 are positioned so as to maintain a uniformly sloping downward grade to promote the drainage of the cooling water from the marine wet exhaust system 14. If additional force is required to propel the cooling water through the filter 28, a holding tank and pump 27 is positioned across the cooling water conduit 26 upstream of the filter 28.

While the muffler/water separator 22 also attenuates the exhaust noise, a secondary muffler 34 (shown in phantom) may be positioned across the second exhaust conduit 24 to provide additional attenuation. The secondary muffler 34 may be any one of those that are commercially available, including so-called "dry mufflers." Exemplary mufflers are disclosed in U.S. Pat. Nos. 5,196,655 to Woods and 4,713,029 to Ford, the disclosures of which are incorporated by reference.

As best shown in FIGS. 2 and 3, a first embodiment of the preferred muffler/water separator 22 includes a generally cylindrical housing 40 made up from a cylindrical wall 42 and a pair of end caps 44 and 46 (FIG. 2) affixed to the cylindrical wall 42. As shown in FIG. 2, a transverse or calming baffle 48 is positioned across the interior of the housing 40 so as to divide the housing interior into a first chamber 50 adjacent the cap 44 and a second chamber 52 adjacent the cap 46. The cap 44 defines a first outlet 54 leading from the first chamber 50 while the cap 46 defines a second outlet 56 leading from the second chamber 52. A first pipe 58 is secured through the first outlet 54 so that the first pipe 58 opens through a mouth 60 into the first chamber 50. A second pipe 62 is secured adjacent the second outlet 56.

As shown in FIG. 3, an inlet structure 70 is provided in communication with an inlet pipe 72. The inlet structure 70 comprises an outer wall or wall member 74; an inner wall or wall member 75; and an angled baffle or baffle structure 76.

The outer wall 74 and the inner wall 75 of the inlet structure 70 are spaced in parallel relation to each other relative to an inlet longitudinal axis 77 and define a channel therebetween. The angled baffle 76 is contiguous with the inner wall 75 and has a trailing edge 83 (FIG. 2) which extends toward the outer wall 74 to define an orifice opening 81. The angular disposition of the baffle 76 relative to the outer wall 74 and the restricted opening 81 help to increase the velocity of the exhaust gas (and of the entrained water droplets and particulate materials) as it enters the separator 22. This increased velocity facilitates a swirling pattern to this suspension so as to induce centrifugal separation of the cooling water and the particulate materials from the exhaust gas.

As shown in FIG. 2, the trailing edge 83 of the baffle 76 has an inwardly curving, parabolic shape which also has been found helpful in imparting the desired swirling pattern to the fluid mixture admitted through inlet pipe 72.

In use, exhaust gas, entrained water droplets and entrained particulate materials enter the housing through the inlet structure 70 and spiral downwardly about a housing longitudinal axis 90 toward the calming baffle 48. As the exhaust flow spirals, the relatively heavy water droplets and particulate materials spiral away from the axis 90 toward the cylindrical wall 42.

The exhaust gas enters the mouth 60 of the first pipe 58 near the axis 90 and flows out of the housing 40 through the first outlet 54. Meanwhile, the cooling water and entrained particulate materials move downwardly through apertures 92, 94, 96, 98 (FIG. 3) that are provided in the transverse or calming baffle 48. The number and arrangement of the apertures may, of course, be varied provided that adequate area is provided for communication of the first chamber with the second chamber 52. The separated cooling water and entrained particulate materials exit the housing 40 through the second pipe 62 disposed in the second chamber. Preferably, the cooling water pools over the second outlet 56 to prevent exhaust gas from entering the second pipe 62.

A second embodiment of the water separator 22' is shown in FIG. 4. Here, water separator 22' includes housing 40' made up from a cylindrical wall 42', an end cap 44' and a bottom flange 46'. As with the embodiment 22 of FIGS. 2 and 3, a transverse or calming baffle 48' is welded across the interior of the housing 40' so as to divide the interior into a first chamber 50' adjacent the cap 44' and a second chamber 52' adjacent the flange 46'. Unlike the embodiment shown in FIGS. 2 and 3, the flange 46' of the separator 22' includes first and second outlets 54' and 56' leading from the second chamber 52'. A first pipe 58' is welded through the first outlet 54' so that the first pipe 58' passes through the transverse baffle 48' and opens through a mouth 60' into the first chamber 50'. A second pipe 62' is welded adjacent the second outlet 56' radially outwardly from the first pipe 58' and the first outlet 54'.

The housing 40' of the FIG. 4 embodiment has an inlet structure 70' similar in structure to the inlet structure 70 of the embodiment of FIGS. 2 and 3. In use, exhaust gas, entrained water droplets and entrained particulate materials enter the housing 40' through the inlet structure 70' and rotate about the longitudinal axis 90' of the housing 40' toward the calming baffle 48'. As the exhaust flow rotates, the relatively heavy water droplets and particulate materials spiral away from the axis 90' (FIG. 2) toward the cylindrical wall 42'.

The exhaust gas enters the mouth 60' of the first pipe 58' near the axis 90' and below cap 44' and flows downwardly out of the housing 40' through the first outlet 54'. Meanwhile, the cooling water and the particulate materials move downwardly through apertures (not shown) in the transverse baffle 48' into the second chamber 52', from which they exit the housing 40' through the second pipe 62'.

Figure 5:
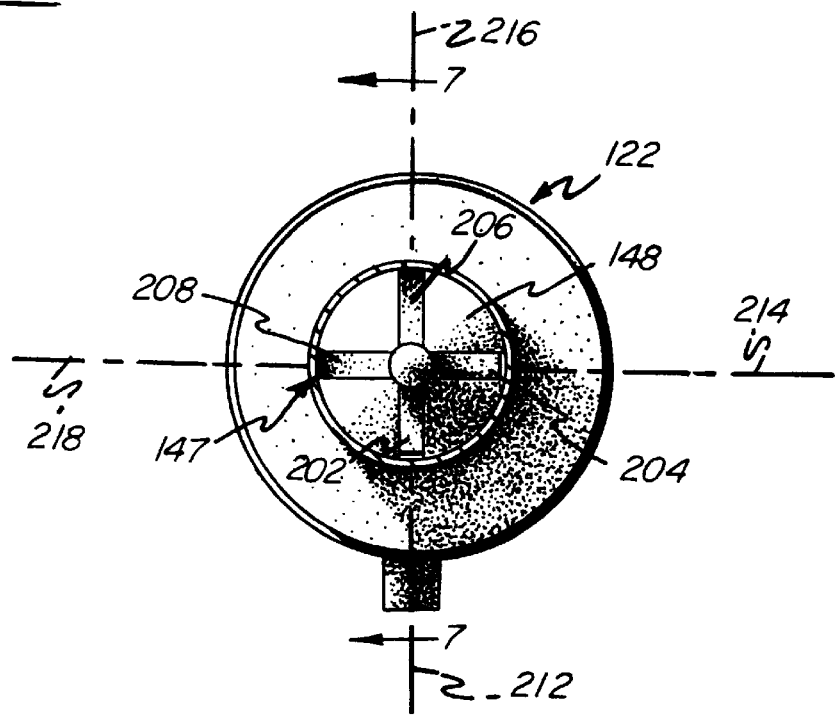
FIG. 5 is a top sectional view of a third embodiment of the preferred combined marine wet muffler and water separator for the marine wet exhaust system of FIG. 1.
Figure 6:
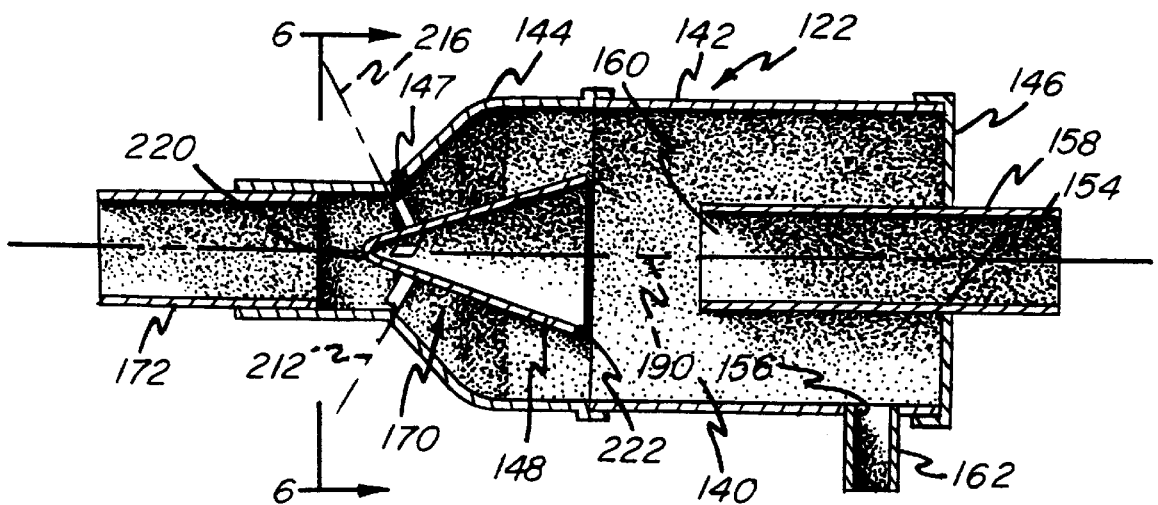
FIG. 6 is a side sectional view of the preferred combined marine wet muffler and water separator of FIG. 5.

A third embodiment of the preferred muffler/water separator 122 which is preferably positioned horizontally in a wet marine exhaust system such as that shown at 14 (FIG. 1) is shown in FIGS. 5 and 6. The muffler/water separator 122 comprises a housing 140 including a cylindrical wall 142 and a pair of end caps 144 and 146 (FIG. 6) attached to the cylindrical wall 142. As shown in FIG. 6, inlet structure 170 is provided in communication with an inlet pipe 172 and is concentric with a housing-longitudinal axis 190. The inlet structure 170 includes the end cap 144, a vane structure 147 and a calming shield 148.

The end cap 144 is substantially formed of a truncated cone diverging outwardly from the inlet pipe 172 toward the cylindrical wall 142. The end cap 146 includes a first outlet 154 leading from within the housing 140. A first pipe 158 is attached through the first outlet 154 coaxial to the housing longitudinal axis 190 and opens through a mouth 160 into the housing 140. A second outlet 156 leading from within the housing 140 is located in the cylindrical wall 142 adjacent the end cap 146 such that the second outlet 156 may be positioned at the lowest point of the housing 140 when the muffler/water separator 122 is installed. A second pipe 162 is vertically disposed and attached to the cylindrical wall 142 adjacent the second outlet 156 below the first pipe 158 and the first outlet 154.

As shown in FIG. 5, the vane structure 147 is attached to the end cap 144 and preferably includes a series of blades 202, 204, 206 and 208 extending radially outwardly from the housing longitudinal axis 190. The span of each blade extends parallel to a center axis 212, 214, 216 and 218 oblique to the housing longitudinal axis 190.

Each blade 212, 214, 216, 218 preferably has a finite angle of attack to facilitate a swirling pattern in the exhaust flow entering the muffler/water separator 122 to induce centrifugal separation of the exhaust gas from the cooling water and particulate materials. The number and arrangement of the blades 212, 214, 216, 218, as well as the blade profiles, may be varied provided that adequate swirling motion is imparted to the exhaust flow.

As shown in FIG. 6, the calming shield 148 is substantially conical, having first and second ends 220, 222 spaced coaxially along the housing longitudinal axis 190. The first end 220 is supported by the vane structure 147 while the second end 222 rests adjacent the mouth 160. The diameter of the second end 222 is at least as large as the inner diameter of the mouth 160 so as to prevent direct fluid flow from the inlet structure 170 to the mouth 160.

In operation, the exhaust gas, entrained water droplets and entrained particulate materials enter the housing through the inlet structure 170. The vane structure 147 imparts a swirling motion to the exhaust flow. As the exhaust flow spirals along the inner wall of the housing 140, the relatively heavy water droplets and particulate materials spiral away from the housing longitudinal axis 190 toward the cylinder wall 142.

The exhaust gas exits the muffler/water separator 122 through the first outlet 154 and the first pipe 158. The extracted water (and the entrained particulate materials) drops toward the bottom of the housing 140 and exit the muffler/water separator 122 through the second outlet 156 and the second pipe 162.

In each of the three embodiments 22, 22' and 122, the tortuous flow paths combined with the effects of the water droplets in the exhaust gas serve to attenuate exhaust noise. It is believed that the housings 40, 40' and 140 may be "tuned" to further attenuate the exhaust noise.

Figure 7:
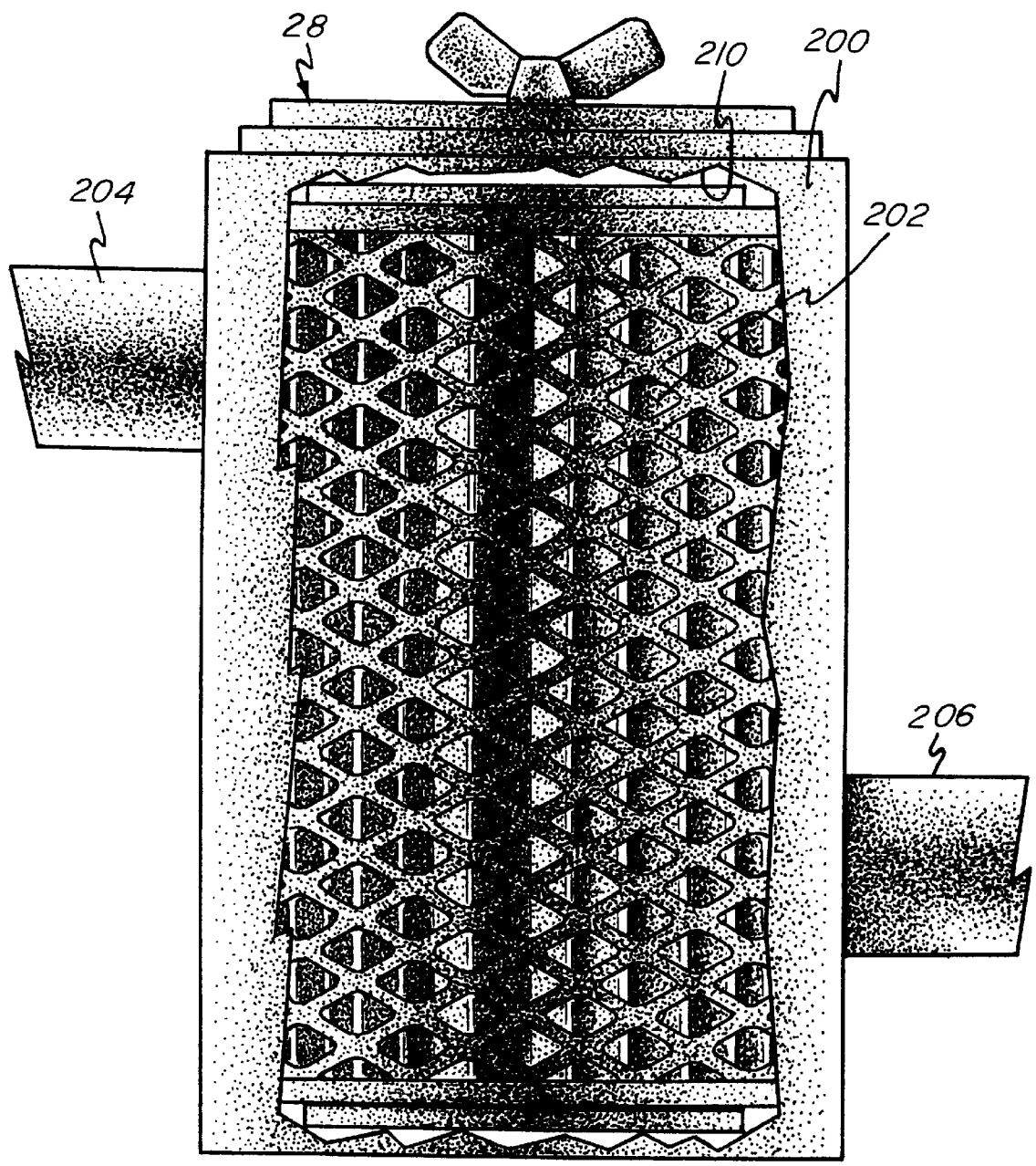
FIG. 7 is a schematic side view of a preferred filter for the marine wet exhaust system of FIG. 1.

As shown in FIG. 7, the preferred filter 28 is a fibrous-type filter including a filter housing 200 at least partially surrounding a removable filter cartridge 202. A filter inlet pipe 204 communicates with cooling water conduit 26 while a filter outlet pipe 206 communicates with the water drain 30. An access opening 210 in the housing 200 provides access to the filter cartridge 202 for cleaning or replacement of the cartridge 202.

In use, the separated cooling water and the entrained particulate materials flow into the filter housing 200 through the filter inlet pipe 204. The particulate materials are retained by the filter cartridge 202. The cooling water itself flows through the filter cartridge 202 and enters the water drain 30 through the filter outlet pipe 206. The filter cartridge 202 is periodically cleaned or replaced so that the accumulated particulate materials do not obstruct the flow of cooling water toward the water drain 30.

As suggested by the foregoing, the marine wet exhaust system 14 of the present invention serves to separate and collect particulate materials from the exhaust flow, thereby inhibiting the release of these particulate materials to the environment. Particulate materials entrained in the exhaust gas entering the marine wet exhaust system 14 through the first exhaust conduit 16 are separated with the waste cooling water in a centrifugal separator such as the muffler/water separator 22. The particulate materials exiting the muffler/water separator 22 with the separated waste cooling water are themselves separated and collected in the filter 28. The filtered cooling water is discharged through the water drain 30 while the separated exhaust gas is expelled through the second exhaust conduit 24. The particulate materials collected in the filter 28 may be disposed of in an environmentally acceptable manner.

In theory, the same result could be achieved by interposing a filter (not shown) across the exhaust system upstream of the water separator. In the current state of technology, however, this arrangement is not believed to be commercially practical. A filtering system capable of handling the flow volume of the suspension of water droplets in the exhaust upstream of the water separator would be too large to be easily accommodated in the limited space available in a watercraft. In addition, a filtering system of the necessary size may inhibit the efficient operation of the marine engine 10.

Having described the invention in detail and by reference to preferred embodiments thereof, it will be apparent that modifications and variations are possible without departing from the scope of the appended claims.

What is claimed is:

1. A marine wet exhaust system comprising a separator for receiving an exhaust flow including gaseous, engine coolant liquid, and solid particulate components and for separating the engine coolant liquid and particulate solid components from the gaseous component; a filter downstream from the separator for receiving the engine coolant liquid and particulate solid components and for separating the particulate solid component from the engine coolant liquid component; an engine coolant liquid drainage conduit in communication with said separator; and a pump positioned intermediate the separator and the filter for facilitating flow of the engine coolant liquid and particulate solid components through the filter.

2. The marine wet exhaust system as recited in claim 1 wherein the separator is a centrifugal separator.

3. The marine wet exhaust system as recited in claim 1 wherein the separator includes means for attenuating exhaust noise.

4. The marine wet exhaust system as recited in claim 1 wherein the filter is a fibrous-type filter.

5. The marine wet exhaust system as recited in claims 1 wherein the filter includes a removable filter cartridge for collecting the particulate component.

6. A marine wet exhaust system comprising a first conduit for receiving an exhaust flow including droplets of an engine coolant liquid and a particulate material suspended in a gaseous phase; separator means for separating the engine coolant liquid and the particulate material from the gaseous phase; a second conduit for expelling the gaseous phase; a third conduit for receiving the engine coolant liquid and the particulate material from the separator means; filter means for receiving the engine coolant liquid and the particulate material from the third conduit and for separating the particulate material from the engine coolant liquid; a fourth conduit communicating with said filter means for discharging the engine coolant liquid; and a pump positioned across the third conduit upstream of the filter means for propelling the engine coolant liquid and the particulate material through the filter means.

7. The wet marine exhaust system as recited in claim 6 wherein the third conduit, the filter means and the fourth conduit maintain a monotonely downward grade.

8. The wet marine exhaust system as recited in claim 6 including a holding tank cooperating with the pump and positioned across the third conduit upstream of the filter means.

9. A method for treating the exhaust from a marine engine, the exhaust including gaseous, engine coolant liquid and solid particulate components, comprising the steps of:

a) separating the engine coolant liquid and solid particulate components from the gaseous component;

b) discharging the gaseous component;

c) applying a propelling force to the engine coolant liquid and solid particulate components;

d) separating the solid particulate component from the engine coolant liquid component;

e) discharging the separated engine coolant liquid component from step d); and f) collecting the solid component.

10. The method as recited in claim 9 including the additional step of forming a suspension of the liquid component in the gaseous component prior to step a).

11. The method as recited in claim 9 wherein the step a) includes centrifugally separating the liquid and solid particulate components from the gaseous component.

12. The method as recited in claim 9 wherein the step a) includes attenuating noise in the exhaust.

13. The method as recited in claim 9 wherein the step d) includes passing the liquid component through a filter impervious to the solid particulate component.

14. The method as recited in claim 9 wherein the steps d) and f) include passing the liquid component through a filter impervious to the solid particulate component and cleaning the filter to collect the solid particulate component.

15. The marine wet exhaust system as recited in claim 1 further comprising a holding tank cooperating with the pump.

16. The method as recited in claim 9 including the additional step of collecting the engine coolant liquid and particulate components intermediate steps (a) and (c).

* * * * *